United States Patent [19]

Chane-Ching et al.

[11] Patent Number: 5,733,361
[45] Date of Patent: Mar. 31, 1998

[54] HIGH CONCENTRATION COLLOIDAL DISPERSION OF A CERIUM COMPOUND AND A PROCESS FOR ITS PREPARATION

[75] Inventors: Jean-Yves Chane-Ching, Eaubonne; Thierry Chopin, Saint-Leu La Foret, both of France

[73] Assignee: Rhone-Poulenc Chimie, Courbevoie Cedex, France

[21] Appl. No.: 527,337

[22] Filed: Sep. 12, 1995

[30] Foreign Application Priority Data

Sep. 12, 1994 [FR] France ................... 94 10855

[51] Int. Cl.$^6$ ............... B01J 13/00; C23F 11/00
[52] U.S. Cl. ............... 106/14.21; 252/313.1; 252/314; 423/DIG. 14
[58] Field of Search ............ 252/313.1, 314; 106/14.25, 14.21; 423/21.5, 263, DIG. 14; 502/304

[56] References Cited

U.S. PATENT DOCUMENTS

| 3,024,199 | 3/1962 | Pasfield | 252/313.1 |
|---|---|---|---|
| 4,231,893 | 11/1980 | Woodhead | 252/313.1 |
| 4,356,106 | 10/1982 | Woodhead et al. | 252/313.1 |
| 4,699,732 | 10/1987 | Woodhead | 252/314 |
| 5,021,192 | 6/1991 | David et al. | 252/313.1 |
| 5,132,048 | 7/1992 | Picard-Seon et al. | 252/313.1 |
| 5,376,305 | 12/1994 | Chane-Ching et al. | 252/313.1 |

FOREIGN PATENT DOCUMENTS

| 0186313 | 7/1986 | European Pat. Off. |
|---|---|---|
| 0206906 | 12/1986 | European Pat. Off. |
| 0239479 | 9/1987 | European Pat. Off. |
| 0316205 | 5/1989 | European Pat. Off. |
| 0335538 | 10/1989 | European Pat. Off. |
| 2652805 | 4/1991 | France. |

OTHER PUBLICATIONS

Weiser, H.B., *The Hydrous Oxides*, First Edition, McGraw-Hill Book Co., Inc., New York (1926) pp. 254-258.

*Primary Examiner*—Richard D. Lovering
*Attorney, Agent, or Firm*—Burns, Doane, Swecker & Mathis, L.L.P.

[57] ABSTRACT

In a first embodiment, the present invention concerns a colloidal dispersion of a cerium compound, characterised in that it has a $CeO_2$ concentration of between 500 and 700 g/l and a conductivity of at most 50 mS/cm. In a second embodiment, the colloidal dispersion is characterised in that it has a $CeO_2$ concentration of more than 700 g/l.

A process for the preparation of the dispersion of the invention is characterised in that a starting suspension or dispersion is treated by dialysis or with a cationic resin and an anionic resin.

Colloidal dispersions of the invention can be used in automobile post combustion catalysis, in cosmetics, in lubrication, in ceramics or as an anticorrosion agent.

16 Claims, No Drawings

5,733,361

HIGH CONCENTRATION COLLOIDAL DISPERSION OF A CERIUM COMPOUND AND A PROCESS FOR ITS PREPARATION

BACKGROUND OF THE INVENTION

1. Field of the Invention

The present invention concerns a high concentration colloidal dispersion of a cerium compound.

2. Description of the Prior Art

Dispersions of cerium compounds have a number of applications. A specific example is heterogeneous catalysis, in particular the treatment of exhaust gases from internal combustion engines (automobile post-combustion catalysis). These dispersions can also De used as anticorrosion coatings or in cosmetics.

A number of processes for the preparation of these dispersions have been described. However, known processes cannot produce a dispersion with a very high concentration of cerium compound. However, in the applications mentioned above where the dispersions are used to impregnate a support with cerium, it is of importance to be able to provide high concentration dispersions. Further, in applications such as catalysis or cosmetics it is also necessary to use pure dispersions, i.e., which contain as few ions other than cerium as possible.

SUMMARY OF THE INVENTION

The object of the invention is thus to provide a colloidal dispersion with a high concentration and, if necessary, a high purity.

In a first embodiment, a colloidal dispersion of a cerium compound of the invention is characterised in that it has a $CeO_2$ concentration of between 500 and 700 g/l and a conductivity of at most 50 mS/cm.

In a second embodiment, a colloidal dispersion of a cerium compound is characterised in that it has a $CeO_2$ concentration of more than 700 g/l.

The invention also concerns a process for the preparation of such dispersions, characterised in that a starting suspension or dispersion is treated by dialysis or with a cationic resin and an anionic resin.

Other features, details and advantages of the invention will become apparent from the following description and non limiting examples which illustrate the invention.

DETAILED DESCRIPTION OF THE PREFERRED EMBODIMENTS OF THE INVENTION

In the remainder of the description, the expression "colloidal dispersion of a cerium compound" means any system constituted by fine solid particles with colloidal dimensions which is based on cerium oxide and/or hydrated oxide (hydroxide) in suspension in an aqueous liquid phase, the species also optionally containing trace amounts of bound or adsorbed ions such as nitrates, acetates, citrates or ammonium ions. It should be noted that in these dispersions, the cerium can be either completely in the form of colloids, or both as ions and as colloids.

It should also be noted that the average diameter of the colloids means the average hydrodynamic diameter thereof, as determined by quasi-elastic scattering of light using the method described by Michael L McConnell in Analytical Chemistry 53, no 8, 1007A, (1981).

Further, the term "purity" here refers to the impurities present as ionic species in the dispersion. This purity can be expressed in terms of the conductivity of the dispersion.

Finally, the cerium compound is generally a cerium IV compound.

In the first embodiment of the invention, the colloidal dispersion is characterised by a high concentration (between 500 and 700 g/l) and high purity.

The purity is expressed in terms of the conductivity of the dispersion which is at most 50 mS/cm, in particular at most 35 mS/cm. The conductivity depends on the pH of the colloidal dispersion. In principle it reduces as the pH is raised.

The pH of the colloidal dispersion is generally between 0.5 and 2, in particular between 0.95 and 2. Depending on the pH, the conductivity is in particular between 5 and 50 mS/cm, more particularly between 5 and 35 mS/cm.

The average diameter of the colloids in the dispersion is between 3 and 100 nm, more particularly between 5 and 50 nm. It is preferable that the colloidal dispersion of the invention has a monodispersed size distribution.

In the second embodiment of the invention, the colloidal dispersion is essentially characterised by a very high concentration. This concentration, expressed in terms of $CeO_2$, is more than 700 g/l, more particularly more than 800 g/l.

This concentration may also be at least 1000 g/l and can be more than 1200 g/l.

In an important variation of the second embodiment, the colloidal dispersion also has a high purity. The purity characteristics described above for the first embodiment apply here too for this variation of the second embodiment.

The pH and colloidal diameter of the dispersion of the second embodiment are the same as that of the first embodiment.

Finally, in the two above embodiments and the dispersions obtained by processes using cerium nitrate as the starting product, the $NO_3/Ce$ molar ratio is less than 0.7, in particular between 0.2 and 0.5.

A process for the preparation of the colloidal dispersions of the invention will now be described.

The essential feature of the process of the invention is the treatment of a starting suspension or dispersion of $CeO_2$ by dialysis or with a resin.

The starting colloidal dispersion can be produced using any known means. Particular reference is made to the processes described in European patent applications EP-A-0 206 906, EP-A-0 208 581 and EP-A-0 316 205. In particular, colloidal dispersions can be used which have been produced by thermohydrolysis of an aqueous salt of cerium IV such as a nitrate, in particular in acidic medium.

Such a process is described in European patent application EP-A-0 239 477 or EP-A-0 208 580.

In the case of dialysis treatment, a dialysis membrane is used which is resistant to the pH of the dispersion or suspension and which has a cutoff diameter such that it is impermeable to colloids. It can, for example, be a cellulose membrane with a thin wall and a cutoff diameter corresponding to a molecular weight of between 12000 to 14000 daltons.

Regarding the resin treatment, highly acidic cationic resins and highly basic anionic resins are preferably used.

In a preferred embodiment, the treatment is begun with a cationic resin then followed with the anionic resin.

The resin treatment is continued until the desired pH is obtained for the dispersion, generally a pH of at most 2.

The resin treatment can be effected in any suitable fashion. The resins can be brought into direct contact with the colloidal dispersion. A preferred method consists of placing the resins in dialysis membrane bags, for example of cellulose material, and introducing the bags into the dispersion to be treated.

Cationic and anionic exchange resins are well known. Examples are cationic resins containing a polystyrene backbone. In particular, those with sulphonate or $H^+$ functional groups can be used. Examples of suitable cationic resins are Amberlite IR 120® or Amberlite IRN 77®.

Examples are anionic resins containing a styrene-divinylbenzene copolymeric backbone. In particular, resins with quaternary ammonium or $OH^-$ functional groups can be used. Examples of suitable anionic resins are Amberlite IRN 78® or Duolite A 101®.

In general, the resins are used in quantities of between 25 and 150 g of dry resin per liter of colloidal dispersion for a concentration of the latter of between 400 and 900 g/l.

The process of the invention may include a preliminary step prior to the dialysis or resin treatment described above. This preliminary step is particularly useful when starting from a suspension containing a high concentration of $CeO_2$ and which may thus have a high concentration of impurities and a tendency to settle out. This step consists of reducing the ionic strength of the starting suspension or colloidal dispersion, i.e., reducing the concentration of ionic impurities in the colloidal dispersions. These impurities may, for example, be nitrate and ceric ions.

A number of methods can be used.

The ionic strength may be reduced by washing/decanting. The starting suspension is decanted after adding deionised water and removing the supernatant liquid. More water is added to the remaining portion which is taken up again into suspension. This operation can be carried out a number of times one after the other. A further suitable method is dialysis. The description above regarding dialysis is applicable here.

Ultrafiltration can also be used. In this case, ultrafiltration is alternated with dilution of the ultrafiltered suspension using an acidic solution, for example with a pH of 1, using nitric acid.

Finally, the ionic strength can be reduced using ion exchange resins.

In all these cases, the operations described in the methods discussed above for this preliminary step can be repeated until a given conductivity is obtained.

A final possible step in the process of the invention is a final step of concentration of the dispersion obtained after the dialysis or resin treatment.

Concentration can be effected using any suitable means.

Firstly, ultrafiltration can be used, carried out under the conditions described above.

The dispersion can also be evaporated.

A further important method is osmotic compression, the principle of which is the equilibration of the chemical potential of water across a membrane.

This is effected by placing the colloidal dispersion in a dialysis bag, for example of cellulose material, the bag being placed in an aqueous solution with a chemical potential of water which is different to that of the aqueous phase of the dispersion. This can be effected, for example, using an aqueous solution of polyethylene glycol (PEG) and $NaNO_3$. The concentration of PEG fixes the osmotic pressure and thus the final concentration of the colloidal dispersion of the cerium compound.

All the steps of the processes described above are preferably carried out at room temperature.

The colloidal dispersions of the invention as described above or obtained using processes which are to be described can be employed in a number of applications. Examples are automobile post-combustion catalysis, cosmetics, lubrication and ceramics. They can also be used on a substrate as an anticorrosion agent.

The colloidal dispersions of the invention are particularly suitable for the treatment of metallic substrates, in particular steel substrates containing chrome and/or aluminium or alloy substrates containing chrome and/or aluminium.

Examples are martensitic, ferric and austenitic stainless steels; the latter type can be stabilised with titanium or niobium. Further examples are refractory steels or alloys such as Fe—Cr—Al, Ni—Cr—Al—Y, Co—Cr—Al—Y or Fe—Al or Ni—Al alloys.

The substrate needs no particular pretreatment prior to the treatment apart from conventional degreasing and cleaning. The substrates may or may not be pre-oxidised.

The dispersion can be directly deposited on the substrate from the suspension of the invention using conventional coating techniques such as dipping or spraying.

Following deposition, the substrate has a layer adhering to the surface, and it can be handled.

The substrate must then be heat treated, to remove water in particular.

Heat treatment is usually carried out at a temperature of at most 600° C. This temperature may be lower, for example at most 400° C., depending on the nature of the substrates.

Examples will now be given. In the examples, the conductivity was measured using a CDM 83 (Radiometer Copenhaugen) conductimeter with a CDC 304 measuring cell.

EXAMPLE 1

A cerium IV compound which was dispersable in water was synthesized by thermohydrolysis of 6 liters of cerium nitrate solution with a concentration, expressed in terms of $CeO_2$, of 80 g/l, obtained by diluting a stock solution ($Ce^{4+}$=1.25M and $H^+$=0.5N) in deionised water. Thermohydrolysis was carried out for 4 hours at 100° C.

The precipitate obtained was filtered and broken up by adding 180 cc of deionised water.

A first dispersion purification phase, consisting of eliminating the nitrate and ceric ions present in the dispersion, was carried out by decanting and removing the supernatant liquid. After homogenisation of the dispersion previously obtained by stirring, the pH was 1.25 and the conductivity was 227 mS/cm. The precipitate was allowed to settle out overnight and the supernatant liquid was removed. A further 300 cc of deionised water was added, and the pH of the dispersion after homogenisation was 0.85. The conductivity was 110 mS/cm. The precipitate was again allowed to settle out overnight and the supernatant liquid was removed. A further 180 cc of deionised water was added. After homogenisation, the pH was 0.85 and the conductivity was 70.5 mS/cm. This was again allowed to settle out overnight and the supernatant liquid was removed. The volume was brought to 400 cc with deionised water. After homogenisation, the dispersion exhibited perfect long term stability as regards decantation (colloidal sol) and had a pH of 0.85 and a conductivity of 41.5 mS/cm.

A second purification phase of the colloidal sol was carried out using ROH anionic and RH cationic resins. At t=0 hours, 45 g of wet RH cationic resin (Amberlite IRN 77), inserted in a cellulose membrane in the form of a cylindrical envelope of diameter about 1 cm (Viking, cutoff diameter 12000) which was sealed at both ends, was introduced into the colloidal sol. After 3 hours (t=3 h), 45 g of ROH anionic resin (Amberlite IRN 78) in an envelope as described above was introduced into the colloidal sol. At t=5 h, the cationic resin and the anionic resin were removed. The pH of the colloidal sol was 0.9 and the conductivity was 3mS/cm.

The concentration of the colloidal sol, determined by drying an aliquot at 60° C. and calcining at 1000° C., was 466 g of $CeO_2$/1000 g of dispersion, equivalent to a concentration of 778 g/l of $CeO_2$.

In a third phase, the colloidal sol was concentrated by osmotic compression as follows.

The colloidal sol obtained above was diluted to 300 g of $CeO_2$/1000 g of dispersion with deionised water. The colloidal sol obtained was poured into a cellulose membrane as described above and sealed at its lower end. In a first step, the colloidal sol/cellulose membrane assembly was immersed in a $10^{-2}$M $NaNO_3$ solution with a pH of 1 to equilibrate the nitrate concentration. After this equilibration step (equilibration period of 7 days), the assembly was immersed in an aqueous solution with the following composition: 3% PEG (polyethylene glycol, MW=35000), $NaNO_3{=}10^{-2}$M and pH=1, adjusted with $HNO_3$. After 48 hours, the colloidal sol was recovered and the $CeO_2$ concentration was determined to be 608 g of $CeO_2$/1000 g of dispersion, equivalent to 1277 g of $CeO_2$/liter of dispersion.

The average diameter of the colloids in the dispersion was 50 nm.

The pH of the dispersion was 1.

EXAMPLE 2

400 cc of deionised water was added to 500 grams of a dispersable hydrate obtained by thermohydrolysis of a ceric nitrate solution ($CeO_2$=60 g/l and the ratio $OH/Ce^{4+}$=2).

A first purification phase was effected on the dispersion by decanting and removing the supernatant liquid. After homogenisation of the dispersion previously obtained by stirring, the pH was 1.3 and the conductivity was 150 mS/cm. The precipitate was allowed to settle out overnight and the supernatant liquid was removed. A further 300 cc of deionised water was added, and the pH of the dispersion after stirring was 0.9. The conductivity was 81.7 mS/cm. This was again allowed to settle out overnight and the supernatant liquid was removed. Deionised water was added to give a final volume of 420 cc. After homogenisation, the major portion of the cerium compound was in the colloidal form. After elimination of the small non dispersed portion, 415 cc of a colloidal sol was recovered which had a ph of 1 and a conductivity of 42 mS/cm.

A second purification phase of the colloidal sol was carried out using RH cationic and ROH anionic resins, At t=0 h, 50 g of wet RH cationic resin (Amberlite IRN 77), inserted in a cellulose membrane as described in Example 1, was introduced into the colloidal sol. At t=1 h 50 g of anionic resin (Amberlite IRN 78) in a cellulose envelope was introduced into the colloidal sol. At t=5 h 30 min, the cationic resin and the anionic resin were removed. The pH of the colloidal sol was 1 and the conductivity was 30.8 mS/cm. The $CeO_2$ concentration, determined by drying and calcining, was 373 g of $CeO_2$/1000 g of dispersion, equivalent to a concentration of 550 g/l of $CeO_2$.

In a third phase, the colloidal sol was concentrated by osmotic compression as follows.

The colloidal sol obtained above was diluted to about 200 g of $CeO_2$/1000 g of dispersion. The colloidal sol obtained was poured into a cellulose membrane as described above and sealed at its lower end.

The assembly was equilibrated in a $10^{-2}$M $NaNO_3$ solution with a pH of 1 for 7 days. The membrane/colloidal sol assembly was then immersed in an aqueous solution with the following composition: 14% PEG (MW=35000), $10^{-2}$M $NaNO_3$ at pH=1, and the colloidal sol was recovered after 24 hours. The $CeO_2$ concentration was determined as 619 g of $CeO_2$/1000 g of dispersion, equivalent to 1298 g of $CeO_2$/l.

The average diameter of the colloids in the dispersion was 5 nm.

The pH of the dispersion was 1.

We claim:

1. An aqueous colloidal dispersion of a cerium compound, wherein the dispersion has a $CeO_2$ concentration of greater than 800 g/l.

2. The aqueous colloidal dispersion according to claim 1, wherein the dispersion has a conductivity of at most 50 mS/cm.

3. The aqueous colloidal dispersion according to claim 1, wherein the cerium compound is a cerium IV compound.

4. The aqueous colloidal dispersion according to claim 3, wherein the dispersion has a $CeO_2$ concentration of at least 1000 g/l.

5. The aqueous colloidal dispersion according to claim 1, wherein the dispersion has a conductivity of at most 35 mS/cm.

6. The aqueous colloidal dispersion according to claim 5, wherein the dispersion has a conductivity of between 5 and 35 mS/cm.

7. The aqueous colloidal dispersion according to claim 1, wherein the dispersion has a pH of between 0.5 and 2.

8. The aqueous colloidal dispersion according to claim 7, wherein the dispersion has a pH of between 0.95 and 2.

9. The aqueous colloidal dispersion according to claim 1, wherein the average colloidal diameter is between 3 and 100 nm.

10. The method of using the dispersion according to claim 1, comprising depositing said dispersion on a substrate as an anticorrosion agent.

11. A process for the preparation of an aqueous colloidal dispersion of a cerium compound having a $CeO_2$ concentration of greater than 700 g/l, wherein a starting suspension or dispersion is treated by dialysis or with a cationic resin and an anionic resin to form said aqueous colloidal dispersion of a cerium compound.

12. The process according to claim 11, wherein prior to the dialysis or the cationic resin and anionic resin treatment, the ionic strength of the starting suspension or dispersion is reduced.

13. The process according to claim 11, wherein the ionic strength of the starting suspension or dispersion is reduced by washing and decanting, dialysis, ultrafiltration or treatment with an ion exchange resin.

14. The process according to claim 11, wherein after the dialysis or the cationic resin and anionic resin treatment, the dispersion obtained is concentrated.

15. The process according to claim 14, wherein the dispersion is concentrated by evaporation, osmotic compression or ultrafiltration.

16. The process according to claim 11, wherein the suspension or dispersion is treated with a cationic resin followed by an anionic resin.

\* \* \* \* \*